United States Patent [19]

Klein et al.

[11] 3,941,644

[45] Mar. 2, 1976

[54] APPARATUS FOR GUIDING A STRIP TO A SUPPORT SURFACE

[75] Inventors: Norman Edward Klein; Kenneth James Addis, both of Inman, S.C.

[73] Assignee: Deering Milliken Research Corporation, Spartanburg, S.C.

[22] Filed: Oct. 9, 1973

[21] Appl. No.: 404,328

[52] U.S. Cl. ............ 156/433; 156/117; 156/173; 156/177; 156/397; 156/443; 226/119; 252/15; 308/DIG. 1
[51] Int. Cl.² .................. B29H 9/04; B65H 81/08
[58] Field of Search ........... 156/110, 117, 123, 128, 156/130, 133, 141, 166, 169, 171–173, 177–179, 187, 394, 397, 430, 433, 440, 443, 446, 450, 439; 226/119; 252/15; 308/DIG. 1; 242/43, 43.1, 43.2, 174

[56] References Cited
UNITED STATES PATENTS

| | | | |
|---|---|---|---|
| 2,982,327 | 5/1961 | Vanzo et al. | 152/361 |
| 3,078,022 | 2/1963 | Durbeck et al. | 308/DIG. 1 |
| 3,113,738 | 12/1963 | Vanzo | 156/397 |
| 3,674,584 | 7/1972 | Klein | 156/117 |
| 3,748,203 | 7/1973 | Greene | 156/117 |
| 3,761,341 | 9/1973 | Kimble | 156/173 |
| 3,823,049 | 7/1974 | Vetrovec | 156/178 |
| 3,829,347 | 8/1974 | Honea | 156/577 |
| 3,831,872 | 8/1974 | Fisher et al. | 242/43 |

Primary Examiner—Douglas J. Drummond
Assistant Examiner—John E. Kittle
Attorney, Agent, or Firm—Arthur L. Urban; H. William Petry

[57] ABSTRACT

Apparatus for positioning a continuous strip on a movable support surface in a zigzag pattern including a traversing guide member having a slot passage disposed longitudinally of the movement of the support surface, means for reducing friction in the slot passage of the guide member, and positioning means between the guide member and the support surface movable into the path of the strip at the ends of each traverse to form the reversals of the zigzag pattern.

7 Claims, 8 Drawing Figures

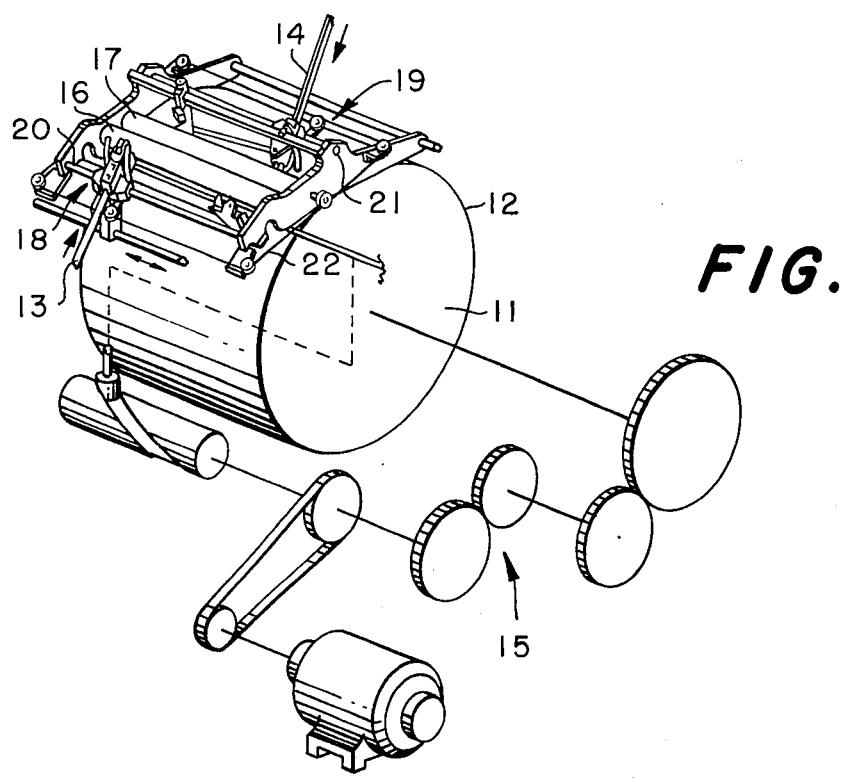
FIG.-1-
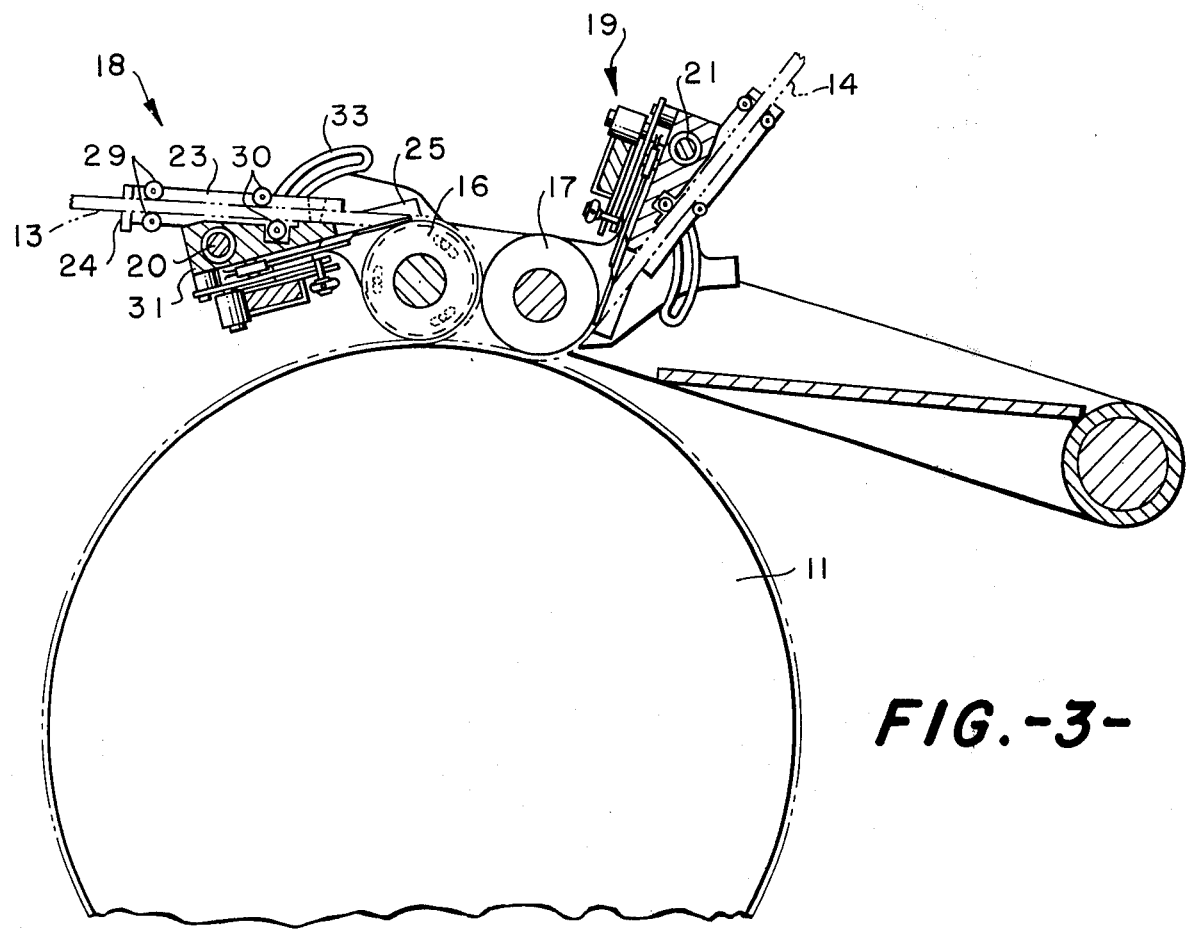
FIG.-3-

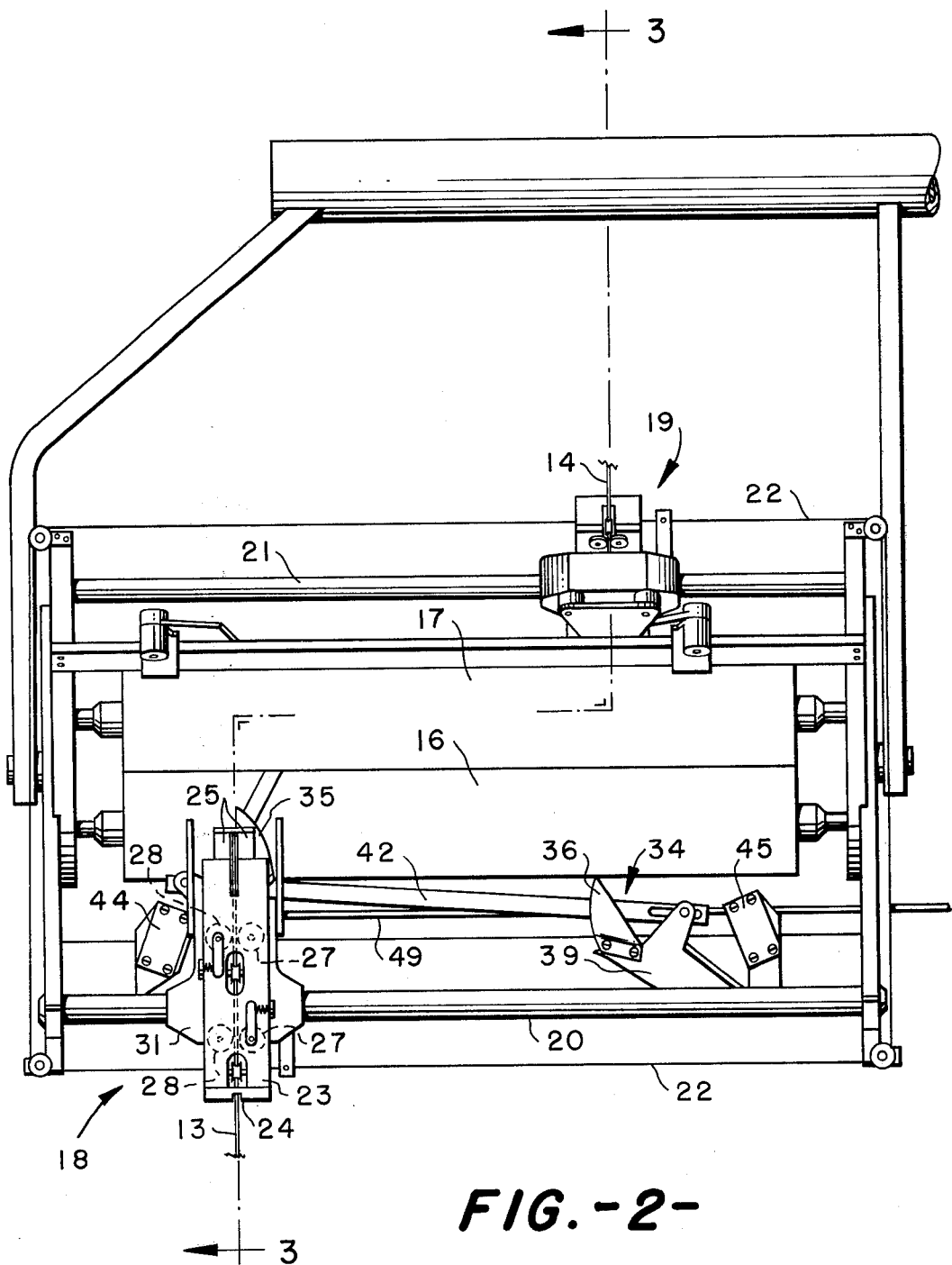
FIG.-2-

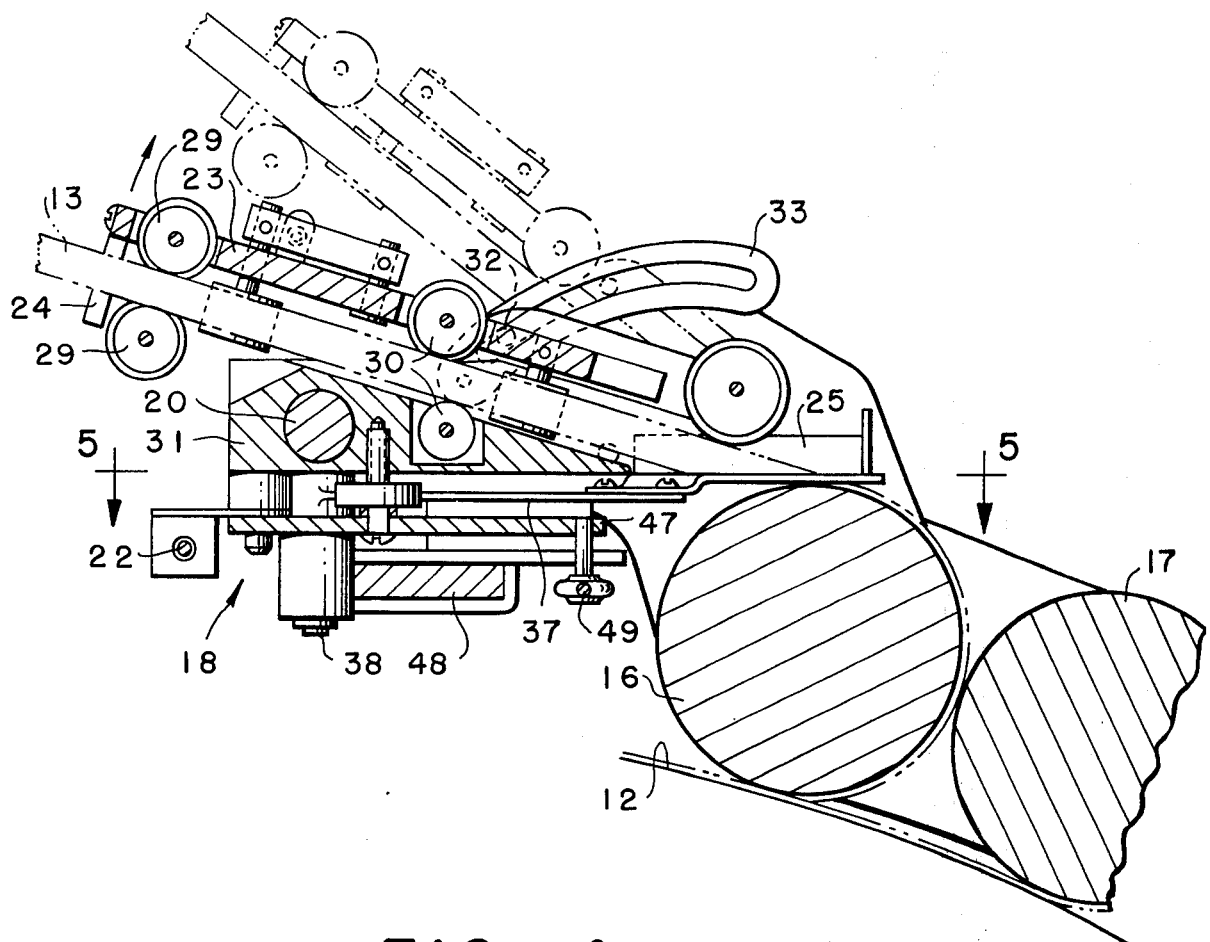
FIG.-4-

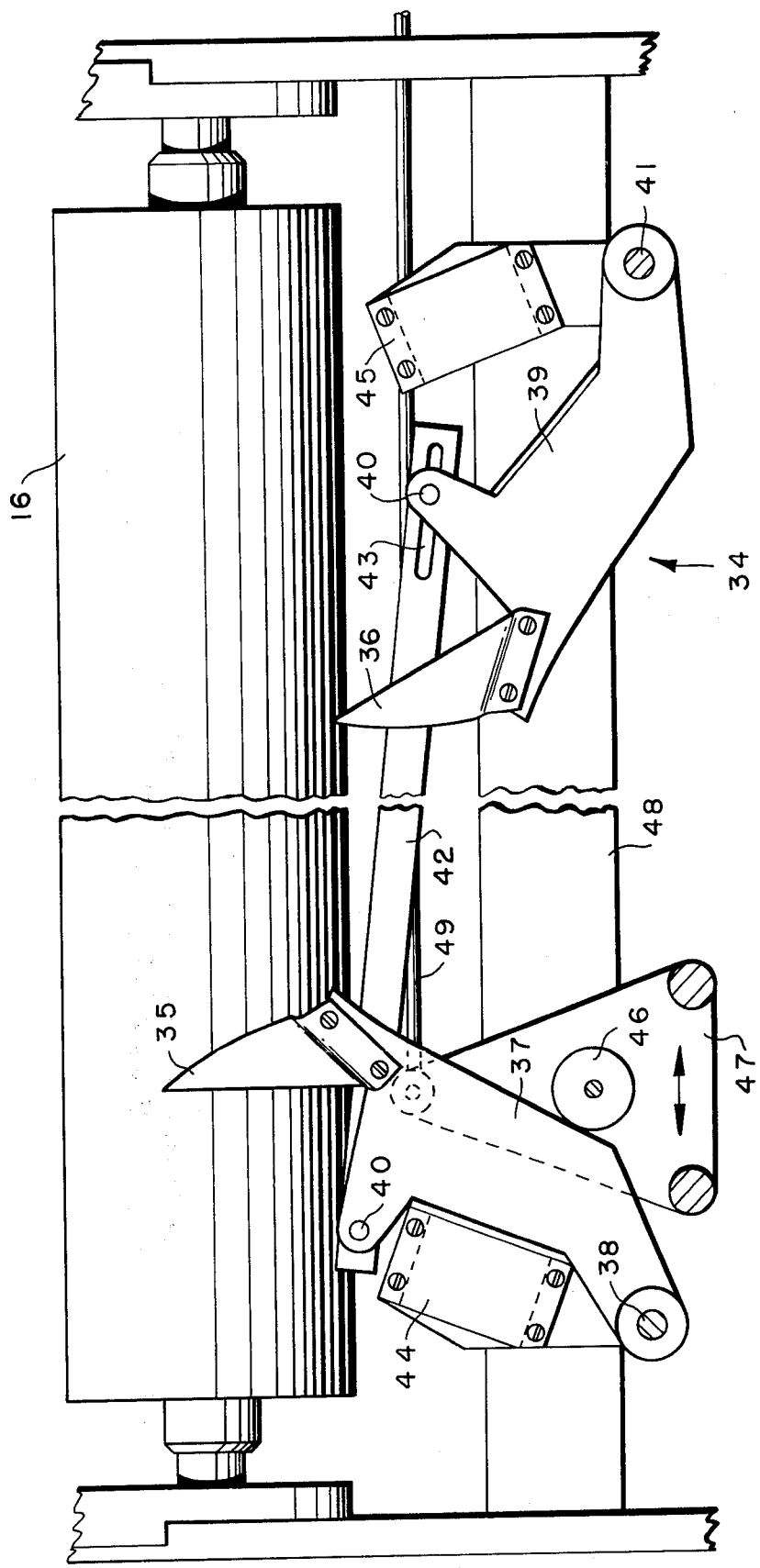

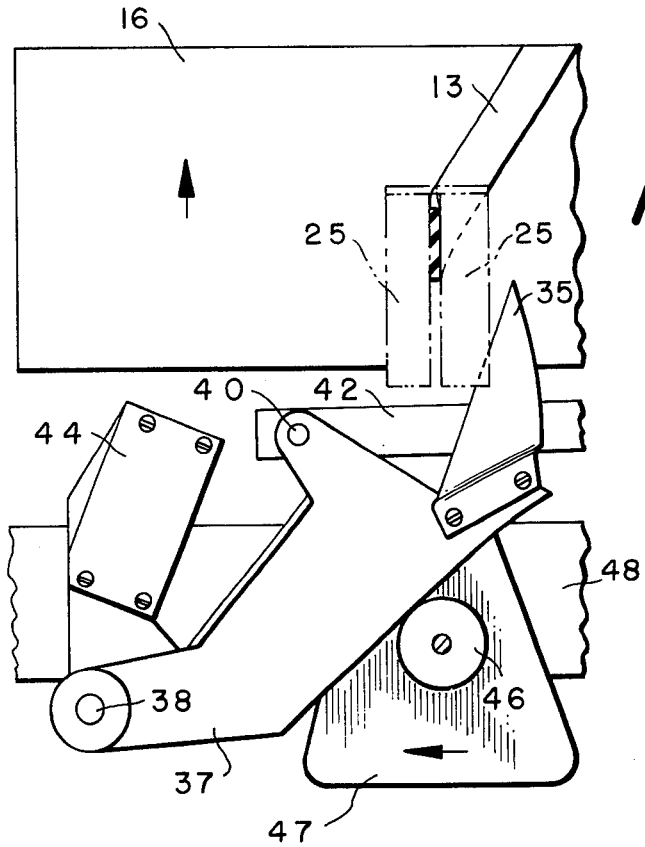
FIG.-6-
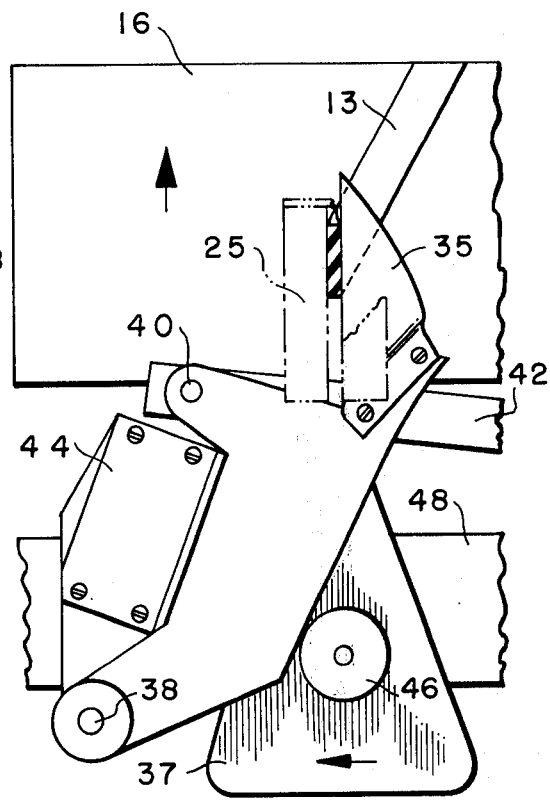
FIG.-7-
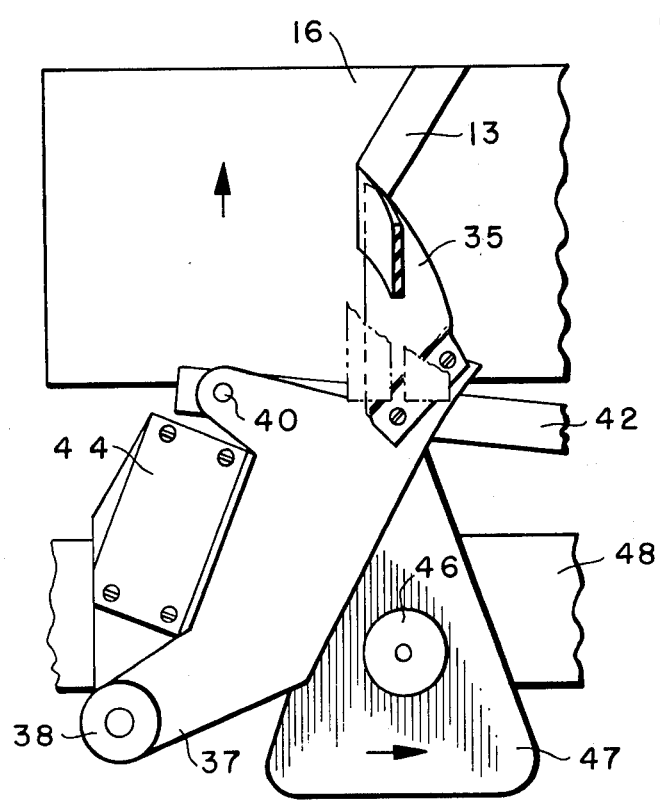
FIG.-8-

APPARATUS FOR GUIDING A STRIP TO A SUPPORT SURFACE

The tire industry has shown considerable interest in tire constructions which include an annular reinforcement or belt about the periphery of the tire between the carcass and tread portions thereof. Such belted tires have better road stability and longer tread life both in radial ply and bias ply carcass constructions.

The annular reinforcements are conventionally formed of cord or wire coated with or embedded in a suitable insulating material such as rubber or other plastic material which is compatible with and has an adhesive affinity to the rubber of the tire. The cord usually is disposed in a pattern in which portions thereof extend at an angle to the longitudinal axis of the reinforcement. One such construction utilizes bias cut woven fabric which has been calendered with a layer of unvulcanized rubber. Also, it has been proposed to form reinforcements by winding one or more cords or strips onto a rotating drum while employing a reciprocating guide to lay the cord or strip in a generally zigzag pattern thereon. Examples of such belts are disclosed in U.S. Pat. Nos. 2,982,327; 3,589,426; 3,720,570; and 3,729,365. One of the considerations in the design of the reinforcement is the minimizing of lateral forces in tires due to the pattern of the outermost layer of the belt. This effect is observed when tires are mounted on a vehicle or on a test wheel under load. These lateral forces create vibrations in the vehicle on which the tires are mounted and in the tire itself, thereby reducing the life of the tire and causing vehicle handling problems. Thus, the cord or strip must be wound in a preselected pattern with a high degree of precision to avoid inaccuracies which could result in the creation of lateral forces in the tire.

The present invention provides a novel apparatus for producing an endless reinforcement with a high degree of folded-edge pattern accuracy. Furthermore, the invention provides a new apparatus for accurately guiding and positioning a plurality of continuous strips on a support surface in a desired folded-edge pattern. Moreover, the moving parts of the apparatus of the invention are of low mass which facilitates high speed operation for extended periods of time.

Other advantages and benefits of the invention will be apparent from the following detailed discussion and description of the drawings in which:

FIG. 1 is a schematic illustration of one form of apparatus of the invention for forming an endless reinforcement;

FIG. 2 is an enlarged top view of the guide apparatus shown in FIG. 1;

FIG. 3 is a sectional view taken along line 3—3 of FIG. 2;

FIG. 4 is an enlarged side elevation of a portion of the guide assembly shown in FIG. 3;

FIG. 5 is an enlarged broken sectional view taken along line 5—5 of FIG. 4; and

FIGS. 6, 7 and 8 are enlarged schematic top views of a portion of the guide assembly of the invention illustrating a sequence in the operation thereof.

As shown in the drawings, one form of apparatus for guiding and positioning unitary strips or ribbons on a support surface includes a rotatable winding drum 11 having a generally cylindrical outer surface 12 providing a support surface for cord strips 13 and 14 to be positioned thereon. Drum 11 is driven by suitable drive means 15. Associated with drum surface 12 are rolls 16 and 17 and guide assemblies 18 and 19 mounted for reciprocation on rods 20 and 21, respectively. Guide assemblies 18 and 19 are interconnected by a cable and pulley arrangement 22.

Guide assembly 18 includes a traverse runner bearing block 31 and a guide housing 23 having a slot passage 24 for the movement therethrough of a cord strip 13. At the outlet portion of the housing 23, gas bearing surfaces 25 attached to runner bearing block 31 are positioned in line with and in front of passage 24. Bearing surfaces 25 are porous metal tubes through which a gas is passed from a pressure source (not shown). Along the sides of the slot passage 24 through the housing 23 are located fixed horizontal rollers 27 and biased horizontal rollers 28. Above and below the slot passage are disposed rollers 29 and 30. These four pairs of rollers reduce friction in the movement of cord strip 13 through the passage 24 and then between and alternately around the two bearing surfaces 25 attached to the forward end of bearing block 31. The angular position of housing 23 with respect to bearing surfaces 25 and roll 16 is controlled by the advance of pin 32 attached to guide housing 23 along arcuate slotted member 33. Changing the angularity provides different strip deposition patterns.

Between the guide housing 23 and the roll 16 is disposed a finger assembly 34 which cooperates with the traversing guide housing 23 to form a zigzag pattern with the continuous strip. The finger assembly 34 includes a pair of finger elements 35 and 36 which are movable alternately into extended positions at each end of the guide assembly traverse. Finger 35 is mounted on a support arm 37 and is pivotable about a pin 38. Support arm 37 is pivotally connected to a corresponding support arm 39 to which finger 36 is affixed. Support arm 39 is pivotable about a pin 41. Support arms 37 and 39 are interconnected by a linkage 42 and pins 40. A slot 43 in linkage 42 permits adjustment of the distance between fingers 35 and 36 for the production of different width belts. Magnets 44 and 45 adjustably supported on member 48 are located outboard of finger support arms 37 and 39 to provide stop-detent means for fingers 35 and 36. A cam roll 46 affixed to a triangular support 47 is attached to traverse runner block 31 which moves along guide rod 20. Support 47 is pivotally connected to a push rod 49.

The operation of the apparatus shown in the drawings will be described with regard to guide assembly 18. During the passage of strip 13 through guide housing 23, the strip is positioned by rollers 27 and 28 which which are adjacent to the sides of the strip and at the same time by rollers 29 and 30 which are adjacent to the top and bottom of the strip. The strip then passes between and around bearing surfaces 25 and is delivered to the surface of roll 16. As roll 16 is rotated with the strip 13 in contact therewith, the strip is carried by the roll into contact with the drum surface 12. The strip is pressed against the surface 12 and adheres thereto as the drum 11 is rotated. Simultaneously with the delivery of the strip to roll 16, the guide assembly 18 is moved along rod 20 and parallel to the axis of roll 16 to position succeeding portions of the strip 13 in spiral fashion along different sections of the roll.

As the guide assembly 18 moves toward an edge of the roll 16, its traverse stops and the guide reverses and moves back toward the opposite edge of the roll. One sequence of movement of the guide at an edge of the roll is illustrated schematically in FIGS. 6 through 8. In FIG. 6, strip 13 advances between bearing surfaces 25 of the guide assembly 18 and is positioned on roll 16 at an angle to the axis of the roll as the guide itself is moving along a line parallel to the axis of roll 16 toward the left side of the Figure. Simultaneously, cam roll 46 is moved into cam-like contact with an edge of support arm 37 pivoting the arm about pin 38 toward magnet 44. Since finger 35 is affixed to support arm 37, the pivoting movement of the arm causes finger 35 to advance along the underside of the right bearing surface toward the strip 13. The strip at that moment is advancing downward and around the right bearing surface in a left-handed spiral-like path.

As shown in FIG. 7, the cam roll 46 has pushed support arm 37 into contact with magnet 44. Likewise, finger 35 has reached its extreme position in line with the opening between bearing surfaces 25 and the finger is in contact with strip 13 which at the same time also has reached its extreme left position. As the guide including bearing surfaces 25 begins its traverse in the opposite direction as shown in FIG. 8, finger 35 is held in its extreme position in contact with strip 13 by the action of magnet 44 holding support arm 37. This retention of the finger 35 in its extreme position as the guide moves in the opposite direction folds strip 13 over the finger. Since roll 16 is rotating, the folded strip 13 deposited thereon is advanced around the periphery of the roll and the folded portion of the strip slides from the end of the finger 35.

As the guide continues its traverse in the opposite direction, cam roll 46 comes into contact with support arm 39, displacing the arm and causing linkage 42 to pull arm 37 away from magnet 44 and move finger 35 into a retracted position. Simultaneously, the movement of support arm 39 causes finger 36 attached thereto to move from its retracted position as shown in FIG. 5 of the drawings into an extended position as shown for the other finger 35 in the same Figure. The traversing of guide 18 from one edge of the roll 16 to the other is repeated in a plurality of cycles with the alternate extension and retraction of the fingers 35 and 36 at the ends of each traverse of the guide to form the folds in the strip on roll 16, which strip pattern is then transferred from roll 16 onto the drum surface 12. Continuing the rotation of drum 11 through a number of revolutions results in the production of an endless reinforcement with the desired uniformity of strip folding and spacing throughout the reinforcement.

While the above description relates to the operation of guide assembly 18, companion guide assembly 19 functions in the same manner. Advantageously, the operation of guide assemblies 18 and 19 is coordinated so that the respective strips 13 and 14 passing therethrough will in combination form the desired preselected pattern and produce an endless reinforcement in a shorter period of time than would be possible when only one strip is employed.

The above description and the accompanying drawings show that the present invention provides a novel apparatus for producing an endless reinforcement with a high degree of folded-edge pattern accuracy. Furthermore, the apparatus of the invention provides for the accurate positioning of a plurality of continuous strips on a support surface in a desired folded-edge pattern. In addition, the moving parts of the apparatus of the invention are of low mass which facilitates high speed operation for extended periods of time.

It will be apparent that various modifications and changes in the apparatus described in detail and shown in the drawings can be made within the scope of the invention. For example, the finger elements utilized to effect the folding or reversal of the strip may be actuated by different mechanisms. Therefore, while the foregoing description and drawings are intended to illustrate the invention, the scope of the invention is to be limited only by the following claims.

That which is claimed is:

1. Apparatus for positioning a continuous strip on a movable support surface in a zigzag pattern including a traversing guide member having a slot passage disposed longitudinally of the movement of said support surface, means for reducing friction in the slot passage of said guide member, and a pair of interconnected, pivotable, cam-actuated finger means co-ordinated with the traverse of said guide member disposed between said guide member and said support surface alternately movable into the path of said strip at the ends of each traverse of said guide member to form the reversals of the zigzag pattern.

2. Apparatus according to claim 1 wherein said support surface is a generally cylindrical surface.

3. Apparatus according to claim 2 wherein a roller is positioned between said positioning means and said cylindrical support surface.

4. Apparatus according to claim 1 wherein said guide member is traversed substantially normal to the movement of said support surface.

5. Apparatus according to claim 1 wherein said means for reducing friction in the slot passage of said guide member are gas bearing surfaces.

6. Apparatus according to claim 1 including a second guide member and a second pair of finger means.

7. Apparatus according to claim 6 including means for co-ordinating the traverse of said guide members.

* * * * *